United States Patent
Tannenbaum et al.

(10) Patent No.: US 8,849,889 B1
(45) Date of Patent: *Sep. 30, 2014

(54) CLUSTERED COMPUTER SYSTEM

(71) Applicant: Advanced Cluster Systems, LLC, Aliso Viejo, CA (US)

(72) Inventors: Ariela Tannenbaum, Newport Coast, CA (US); Zvi Tannenbaum, Newport Coast, CA (US); Bryan M Minor, Mount Vernon, WA (US); Tamas Frajka, Seattle, WA (US); John M. Westerhoff, Chicago, IL (US); Dean E. Dauger, Huntington Beach, CA (US)

(73) Assignee: Advanced Cluster Systems, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,567

(22) Filed: Mar. 18, 2013

Related U.S. Application Data

(63) Continuation of application No. 11/749,554, filed on May 16, 2007, now Pat. No. 8,402,080, which is a continuation of application No. 11/527,319, filed on Sep. 26, 2006, now abandoned.

(60) Provisional application No. 60/720,442, filed on Sep. 26, 2005.

(51) Int. Cl.
*G06F 15/16* (2006.01)
*H04L 29/08* (2006.01)
*G06F 9/46* (2006.01)
*G06F 15/173* (2006.01)

(52) U.S. Cl.
CPC ................................. *H04L 67/10* (2013.01)
USPC ........... 709/201; 718/102; 718/104; 709/224; 709/226

(58) Field of Classification Search
USPC .................................................. 709/201–203
See application file for complete search history.

(56) References Cited

U.S. PATENT DOCUMENTS

| | | | |
|---|---|---|---|
| 5,423,046 | A | 6/1995 | Nunnelley et al. |
| 5,881,315 | A | 3/1999 | Cohen |

(Continued)

FOREIGN PATENT DOCUMENTS

| | | |
|---|---|---|
| JP | 08-87473 A | 2/1996 |
| JP | 2002117010 | 4/2002 |

OTHER PUBLICATIONS

Jahanzeb Sherwani, Libra: a computational economy-based job scheduling system for clusters, 2004, SP&E, p. 573-590.*

(Continued)

*Primary Examiner* — Evans Desrosiers
(74) *Attorney, Agent, or Firm* — Knobbe, Martens, Olson & Bear, LLP

(57) ABSTRACT

A clustered computational system comprises a clustered computational engine, a program host, and a queue manager. The clustered computational engine comprises a plurality of clustered computers and is configured to perform computations. The program host stores a plurality of programs that define computations that can be performed by the clustered computational engine and a plurality of inputs to the programs. The queue manager is configured to determine when the program host has stored sufficient inputs to allow the clustered computational engine to perform a computation defined by the program and to schedule the performance of the computation by the clustered computational engine.

18 Claims, 10 Drawing Sheets

(56) References Cited

U.S. PATENT DOCUMENTS

| | | | |
|---|---|---|---|
| 5,930,768 A * | 7/1999 | Hooban | 705/26.81 |
| 6,108,699 A | 8/2000 | Moiin | |
| 6,202,080 B1 | 3/2001 | Lu et al. | |
| 6,546,403 B1 | 4/2003 | Carlson, Jr. et al. | |
| 6,578,068 B1 | 6/2003 | Bowman-Amuah | |
| 6,751,698 B1 | 6/2004 | Deneroff et al. | |
| 6,782,537 B1 | 8/2004 | Blackmore et al. | |
| 6,968,335 B2 | 11/2005 | Bayliss et al. | |
| 7,093,004 B2 | 8/2006 | Bernardin et al. | |
| 7,136,924 B2 | 11/2006 | Dauger | |
| 7,174,381 B2 | 2/2007 | Gulko et al. | |
| 7,249,357 B2 | 7/2007 | Landman et al. | |
| 7,334,232 B2 | 2/2008 | Jacobs et al. | |
| 7,437,460 B2 | 10/2008 | Chidambaran et al. | |
| 7,472,193 B2 | 12/2008 | Dauger | |
| 7,554,949 B2 | 6/2009 | Chen | |
| 7,937,455 B2 | 5/2011 | Saha et al. | |
| 8,082,289 B2 | 12/2011 | Tannenbaum et al. | |
| 8,140,612 B2 | 3/2012 | Tannenbaum et al. | |
| 8,402,080 B2 | 3/2013 | Tannenbaum et al. | |
| 8,402,083 B2 | 3/2013 | Tannenbaum et al. | |
| 8,676,877 B2 | 3/2014 | Tannenbaum et al. | |
| 2002/0049859 A1 | 4/2002 | Bruckert et al. | |
| 2003/0005266 A1 | 1/2003 | Akkary et al. | |
| 2003/0051062 A1 | 3/2003 | Circenis | |
| 2003/0135621 A1 | 7/2003 | Romagnoli | |
| 2003/0195931 A1 | 10/2003 | Dauger | |
| 2003/0195938 A1 | 10/2003 | Howard et al. | |
| 2004/0110209 A1 | 6/2004 | Yokota et al. | |
| 2004/0157203 A1 | 8/2004 | Dunk | |
| 2004/0252710 A1 | 12/2004 | Jeter et al. | |
| 2005/0021751 A1 | 1/2005 | Block et al. | |
| 2005/0038852 A1 * | 2/2005 | Howard | 709/205 |
| 2005/0060237 A1 | 3/2005 | Barsness et al. | |
| 2005/0076105 A1 | 4/2005 | Keohane et al. | |
| 2005/0108394 A1 | 5/2005 | Braun et al. | |
| 2005/0180095 A1 | 8/2005 | Ellis | |
| 2006/0053216 A1 | 3/2006 | Deokar et al. | |
| 2006/0106931 A1 * | 5/2006 | Richoux | 709/226 |
| 2007/0044099 A1 * | 2/2007 | Rajput | 718/102 |
| 2007/0073705 A1 | 3/2007 | Gray | |
| 2008/0250347 A1 | 10/2008 | Gray et al. | |
| 2008/0281997 A1 | 11/2008 | Archer et al. | |
| 2009/0222543 A1 | 9/2009 | Tannenbaum et al. | |

OTHER PUBLICATIONS

Hamscher: Evaluation of Job-Scheduling Strategies for Grid Computing, 2000, Springer, 191-202.*

"gridMathematica 1.1: Grid Computing Gets a Speed Boost from Mathematica 5", The Mathematica Journal, vol. 9, No. 2, 2004.

"Wolfram gridMathematica", Wolfram Research, Inc., 2007.

Carns et al., "An Evaluation of Message Passing Implementations on Beowulf Workstations", Aerospace Conference, Mar. 6-13, 1999, IEEE 1999, vol. 5, pp. 41-54.

Website http://wolfram.com/products/gridmathematica entitled Wolfram gridMathematica, printed on Oct. 3, 2007.

Dauger et al., "Plug-and-Play Cluster Computing using Mac OS X", IEEE International Conference, Dec. 1-4, 2003, Paper appears in Cluster Computing Jan. 8, 2004, pp. 430-435.

Dauger et al., Plug-and Play Cluster Computing: High-Performance Computing for the Mainstream, IEEE Computing in Science and Engineering, Mar./Apr. 2005, pp. 27-33.

Hamscher et al., "Evaluation of Job-Scheduling Strategies for grid Computing", LNCS: Lecture Notes in Computer Science, 2000, pp. 191-202.

International Search Report dated Sep. 11, 2008, International Application No. PCT/US07/70585.

International Search Report (Application No. PCT/US06/37275) mailed Sep. 24, 2007 (2 pages).

Jahanzeb et al., "Libra: a computational economy-based job scheduling system for clusters", Software Practice and Experience, Feb. 24, 2004, vol. 34, pp. 573-590.

Jain et al., "Data Clustering: A Review", ACM Computing Surveys, Sep. 1999, vol. 31, No. 3.

Maeder, R., "Mathematica Parallel Computing Toolkit: Unleash the Power of Parallel Computing", Wolfram Research, Jan. 2005.

Tepeneu and Ida, "MathGridLink—A bridge between Mathematica and the Grid", Nippon Sofutowea Kagakkai Taikai Ronbunshu, 2003, vol. 20, pp. 74-77.

Wolfram, Stephen: The Mathematica Book 5th Edition; Wolfram Research, Inc. 2003.

Kepner, Jeremy et al., "Parallel Matlab: The Next Generation", Aug. 20, 2004, MIT Lincoln Laboratory, Lexington, MA.

Kim, Hahn et al., "Introduction to Parallel Programming and pMatlab v2.0", 2011, MIT Lincoln Laboratory, Lexington, MA.

* cited by examiner

FIG. 3

Create New Job

| Module Name | Description |
|---|---|
| Weather Forecast | Determine likely weather based on environmental conditions. |
| Rocket Thrust | Determine the thrust that will be achieved by a rocket of specified parameters. |

View Status

| Module | Status | Submitted | Began | Completed |
|---|---|---|---|---|
| Weather Forecast | Completed | 7/12/2006 1:00 pm | 7/12/2006 2:00 pm | 7/12/2006 2:30 pm |
| Rocket Thrust | Queued | 7/12/2006 2:00 pm | N/A | N/A |

CLUSTERED COMPUTER SYSTEM

INCORPORATION BY REFERENCE TO RELATED APPLICATIONS

Any and all priority claims identified in the Application Data Sheet, or any correction thereto, are hereby incorporated by reference under 37 C.F.R. 1.57.

BACKGROUND OF THE INVENTION

1. Field of the Invention

Embodiments of the systems and methods described herein relate to computer systems for scheduling and managing a clustered math engine.

2. Description of the Related Art

Grid computing and clustered computing are two forms of distributed computing in which multiple computers work together to solve computations. In these architectures, a complex computation may be broken down into several parts. Each part of the computation may be distributed to individual computers in the grid or cluster of computers, such that each individual computer performs a part of a computation. Because parts of the computation may be performed in parallel, grid computing and cluster computing can lead to substantial increases in processing power and speed compared to standalone computers.

Many computational systems exist to take advantage of the power of grid computing and clustered computing. For example, gridMathematica is a grid-based version of the commercially-available mathematics engine Mathematica. In many cases, the full power of grid-based or cluster-based computational systems, however, is accessible only to those who have a computer grid or a cluster of computers. Many entities do not have a computer gird or a cluster of computers, and thus often cannot take advantage of the power of grid-based or cluster-based computational systems.

SUMMARY

Embodiments of the systems and methods described herein provide greater access to grid-based or cluster-based computational systems. In one embodiment, the system provides a web-based interface to a clustered math engine, such as, for example, gridMathematica. Advantageously, a user can access the web-based interface using a web browser. Using the web-based interface, the user may schedule the performance of complex computations on a remote clustered math engine. After the performance of the computation, the user may also view results of the computation using the web-based interface.

Embodiments of the systems and methods described herein include a math queue manager that schedules the performance of computations on the clustered math engine. Embodiments further include a program host that stores programs that define the computations that may be performed on the clustered math engine, inputs to those programs, and outputs that result from the computations.

Advantageously, the various features and components of embodiments described herein provide a user access to the computational power of a clustered math engine without requiring the user to own a clustered math engine.

This Summary concisely summarizes the subject matter of this disclosure and does not limit the invention. Indeed, this Summary does not identify every novel or advantageous feature of the embodiments set forth in the Detailed Description. The Detailed Description sets forth novel and advantageous features of some embodiments, but the invention is not limited to any particular embodiment. Accordingly, neither this Summary nor the Detailed Description purports to define the invention.

BRIEF DESCRIPTION OF THE DRAWINGS

FIG. 3 is a simplified screen shot that illustrates the selection of a computation to be performed.

FIG. 5 is a simplified screen shot that illustrates a view status screen.

DETAILED DESCRIPTION

Figure 1:
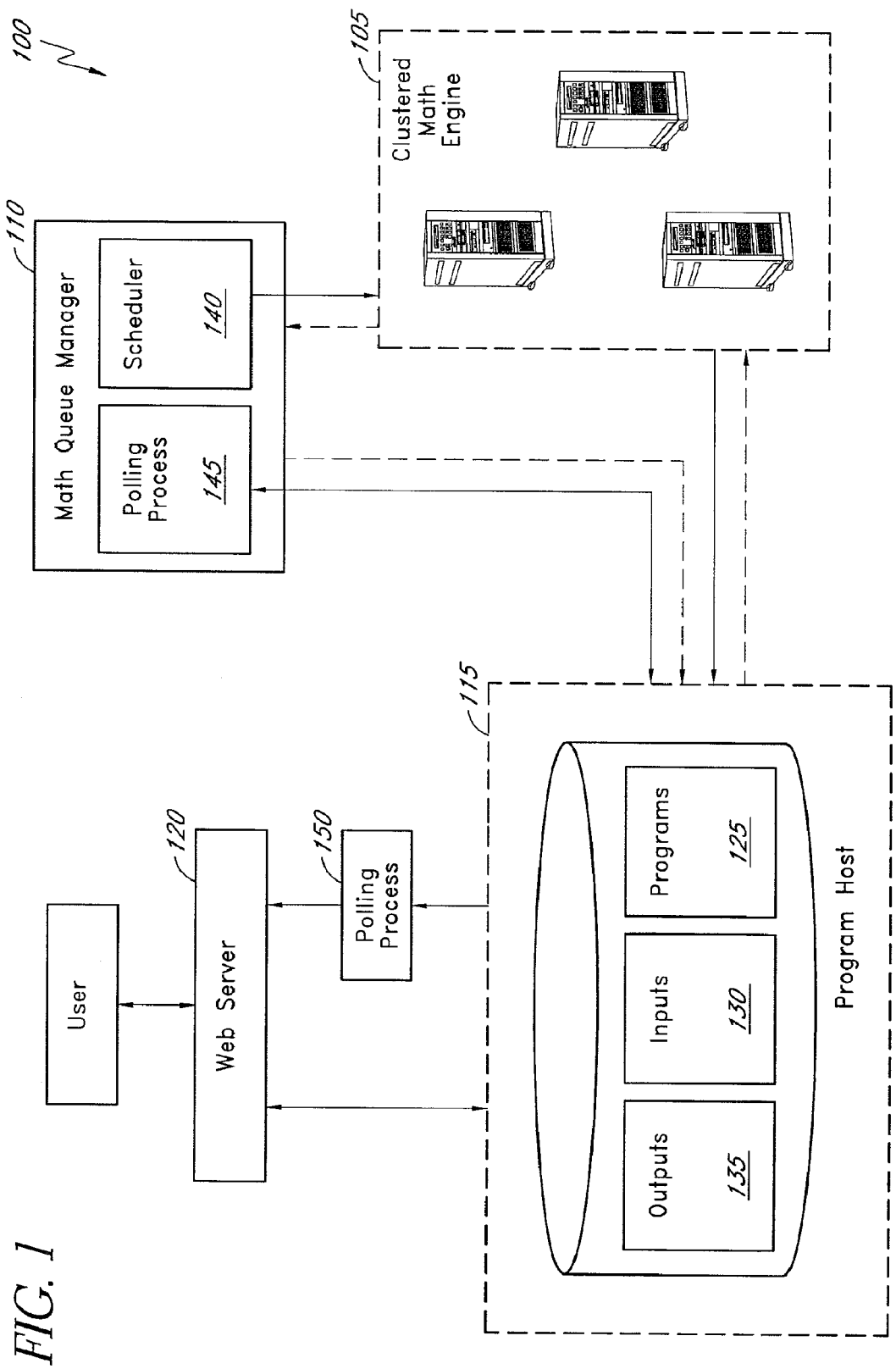
FIG. 1 is a block diagram that illustrates one embodiment of a system for performing clustered computations.

Grid computing and clustered computing are two forms of distributed computing in which multiple computers work together to solve computations. In these architectures, a complex computation may be broken down into several parts. Each part of the computation may be distributed to individual computers in the grid or cluster of computers, such that each individual computer performs a part of a computation. Because parts of the computation may be performed in parallel, grid computing and cluster computing can lead to substantial increases in processing power and speed compared to standalone computers.

Many computational systems exist to take advantage of the power of grid computing and clustered computing. For example, gridMathematica is a grid-based version of the commercially-available mathematics engine Mathematica. In many cases, the full power of grid-based or cluster-based computational systems, however, is accessible only to those who have a computer grid or a cluster of computers. Many entities do not have a computer gird or a cluster of computers, and thus often cannot take advantage of the power of grid-based or cluster-based computational systems.

Embodiments of the systems and methods described herein provide greater access to grid-based or cluster-based computational systems. In one embodiment, the system provides a web-based interface to a clustered math engine, such as, for example, gridMathematica. Advantageously, a user may access the web-based interface using a web browser. Using the web-based interface, the user may schedule the performance of complex computations on a remote clustered math engine. After the performance of the computation, the user may also view results of the computation using the web-based interface.

As used herein, the term "math engine" refers to a computational engine that has predefined complex mathematical operations such as integration. A skilled artisan will appreciate that any computer with an appropriate programming language or application can be configured to perform complex mathematical operations. For example, a programmer can use a language such as C to program an integration operation and other complex mathematical operations. However, the term "math engine" does not encompass a computer with a simple C compiler because C does not have predefined complex mathematical operations. Examples of math engines are Mathematica and Maple, which do have predefined complex mathematical operations. In one embodiment, a math engine includes specialized hardware, such as, for example, a hardware accelerator or FPGAs, designed to perform some or all of the complex mathematical operations. In such embodiments, some operations can be offloaded to a hardware accelerator that may perform the operations faster than a general purpose computer executing software. However, hardware accelerators are not required—the systems and methods disclosed herein can be implemented in software to be executed on a general purpose computer, hardware, firmware, or any combination of software, hardware, and firmware.

Embodiments of the systems and methods described herein include a math queue manager that schedules the performance of computations on the clustered math engine. Embodiments further include a program host that stores programs that define the computations that may be performed on the clustered math engine, inputs to those programs, and outputs that result from the computations.

Herein, several components "store" programs or data. The term "store," as used herein, means to store on a computer-accessible medium such as a hard disk drive, a CD-ROM drive, a magnetic tape drive, an optical disc, a DVD-ROM, in Random Access Memory, on a flash memory device, or in any other form of computer-accessible storage known to a skilled artisan.

Advantageously, the various features and components of embodiments described herein provide a user access to the computational power of a clustered math engine without requiring the user to own a clustered math engine.

Embodiments of systems and methods are now described by way of example and not limitation. For illustration, the examples are described with reference to figures. On the figures, reference numerals indicate components of systems or steps in processes. For clarity, when a particular component or step appears in multiple figures, the same reference numeral is used to identify the component or step in each case. Further, the first digit of each reference numeral corresponds to the figure on which the reference numeral first appears. Thus, for example, the reference numeral 100 first appears on FIG. 1, while the reference numeral 200 first appears on FIG. 2.

FIG. 1 is a block diagram that illustrates one embodiment of a system for performing clustered computations. In one embodiment, a system for performing clustered computations 100 comprises a clustered computation engine 105, a queue manager 110, a program host 115, and a web server 120. The clustered computation engine 105 preferably comprises multiple clustered computers, or a grid of computers, that are collectively configured to perform computations. Preferably, computations are distributed among the multiple computers and are performed in parallel. In one embodiment, the clustered math engine 105 comprises multiple computers that communicate using Message Passing Interface ("MPI"), a standard protocol for the computers in a parallel computing environment to communicate with each other. In one embodiment, as illustrated, the clustered computation engine 105 is a clustered math engine that is particularly configured to perform mathematical computations. An example of a clustered math engine is gridMathematica running on a cluster of computers or a grid of computers.

The term "clustered" is used herein to concisely refer to any group of multiple computers that are configured to distribute a computation such that each computer performs a part of the computation. The term "clustered," as used herein, does not distinguish between computer clusters and computer grids, and does not exclude computer grids. Skilled artisans may, in some cases, distinguish between computer clusters and computer grids. However, embodiments of the systems and methods described herein can preferably be configured to work on computer clusters, computer grids, or both. The term "cluster-specific" will be used when describing any embodiments designed specifically for computer clusters. The term "grid-specific" will be used when describing any embodiments designed specifically for computer grids.

Hereinafter, for ease of explanation and not limitation, the clustered computational engine 105 is referred to as the clustered math engine 105 because, in one implementation, the system provides access to gridMathematica. A skilled artisan will appreciate, in light of this disclosure, that a clustered math engine is a particular example of a clustered computational engine. The invention is not limited to clustered math engines but also may more broadly encompass clustered computational engines in some embodiments.

In one embodiment, the clustered math engine 105 comprises a cluster of computers, or a grid of computers, configured to perform mathematical computations using gridMathematica. The software gridMathematica is commercially-available from Wolfram Research. Alternatively or additionally, other math engine software may be used, such as, for example, Maple, MathWorks, Mathcad, MATLAB, or the like. Alternatively or additionally, a more general computational engine, not necessarily a math engine, may be used. The clustered math engine 105 may use any cluster of computers or grid of computers suitable for running the math engine or computational engine software.

In one embodiment, the queue manager 110 manages the scheduling of computations to be performed by the clustered math engine 105. Hereinafter, the queue manager 110 is referred to as the math queue manager 110 because the preferred embodiment interacts with gridMathematica. A skilled artisan will appreciate, in light of this disclosure, however, that the queue manager 110 may be configured to interact with any computational engine, not necessarily a math engine.

In one embodiment, the program host 115 stores programs that define computations that may be run on the clustered math engine 105. Additionally, the program host 115 may store inputs to the programs. Additionally, the program host 115 may store outputs that result from the performance of computations. In one embodiment, the program host 115 includes one or more databases residing on one or more computers. In this embodiment, the programs can be stored as one or more data objects stored in the database. Alternatively or additionally, the programs can be stored as separate files that are referenced by data items or records in the database. Alternatively or additionally, the program host 115 stores the programs as files in a file system and allows the files to be accessed using file system operations.

As indicated above, a program defines a computation that may be run on the clustered math engine 105. Generally, a program comprises one or more computer-executable instructions that set forth a computation. The term "program" encompasses an algorithm, a procedure, a function, an operation, or any other mechanism that defines a computation.

Herein, the term "computer-executable instructions" includes any instructions that cause a computer to perform any task, whether those instructions are encoded in compiled code, code that requires interpretation to be executed, or any other type of encoding.

In one embodiment, the web server 120 provides a web-based interface to a user. Using the web-based interface, the user may request the performance of a computation, enter inputs for the computation, view status information regarding scheduled or completed computations, view results of completed computations, and the like. In one embodiment, the web server 120 includes or is in communication with a graphics component configured to display the results of computations in graphical format. In one embodiment, the web server is a standard web server that provides the user access to the system via a standard web browser.

In one embodiment, the web server 120 provides a web interface, at least in part, by using functionality of webMathematica, a web-based version of Mathematica that is commercially available from Wolfram Research. Because webMathematica is designed as a web application, it provides user-friendly input, output, and display to users in a web-based environment. However, webMathematica is not natively configured to interface with a clustered math engine. Accordingly, embodiments of the systems and methods described herein enhance the capabilities of webMathematica and use them to build a user-friendly interface to a clustered math engine, as described herein. While webMathematica is used in one embodiment, other environments for receiving user input and displaying output to a user known to a skilled artisan can be used in place of or in addition to webMathematica.

The graphics component (implemented using webMathematica in one embodiment) is configured to generate graphical displays of results. In addition, in one embodiment, the graphics component has its own computational power. Advantageously, the computational power of the graphics component is used, in one embodiment, to perform less complex computations that do not require the clustered math engine 105. In addition, the graphics component may be used to perform post processing of computational results.

An example transaction is now described in order to illustrate in greater detail the components and functions of the web server 120, the program host program host 115, the math queue manager 110, and the clustered math engine 105. A transaction begins when a user interacts with the web server 120. Herein, the term "user" is not necessarily limited to a human user. A user may be an automated process, such as, for example, a batch process that is configured to periodically interact with the system and request the performance of a computation.

The user interacts with the web server 120 to request the execution of a specific computation. To facilitate the user's selection of a computation, the web server 120 may present to the user a list of computations available to the user that may be run on the clustered math engine 105. In one embodiment, the computations are defined by programs stored on the program host 115. The web server 120 may communicate with the program host 115 to determine which computations are available to the user. The user may have access to all computations, to a subset, or to none. The user's access may be governed by user-specific permissions. For example, in one embodiment, computation subscriptions may be sold and the user's access may be restricted by which subscriptions have been purchased on behalf of the user. Alternatively or additionally, access permissions may be based on security levels, such that, for example, a scientist working on a project may be granted access to computations related to the project while a data entry clerk may not have access.

In one embodiment, the program host 115 comprises storage of programs 125, inputs 130, and outputs 135. The programs 125 include the programs that define the computations that may be performed on the clustered math engine 105. The inputs 130 include parameters, values, and other inputs to the computations. For example, in a simple computation of batting average, the computation requires inputs of number of hits and number of at bats. The outputs 135 comprise outputs of computations that have been run. Advantageously, in one embodiment, the outputs 135 are stored for a period of time, such as, for example, a year or more, nine months or more, six months or more, 3 months or more, 2 months or more, or 1 month or more. Advantageously, embodiments of the systems and methods described herein allow the user to access the results of a computation for as long as the results are stored in the outputs 135.

In one embodiment, upon selecting a computation for scheduling, the user may also specify the inputs 130 to the computation. The web server 120 communicates with the program host 115 to determine which inputs are required and provides an interface for entering the inputs. The user can enter the inputs in a variety of ways. For example, the user may type the inputs into a form with fields to be filled out. Alternatively or additionally, the web server 120 may provide a mechanism for importing inputs from a text file, a spreadsheet file, or a similar source.

In some cases, particularly for complex computations, a user may not know the value of every input but may subsequently find out the value of inputs over time. For example, in a computation of average household income over a large geographic area, the user may receive household income statistics from specific geographic areas at different times. On one day, the user may receive statistics about New York. On subsequent days, the user may receive statistics from Maine, then Idaho, then California, then Hawaii, and so on. Preferably, the program host 115 allows the user to store an incomplete set of inputs and to supplement the inputs 130 at later times.

In one embodiment, upon the receipt of a program selection and input values by the program host 115, the math queue manager 110 schedules performance of the selected program by the clustered math engine 105. In one embodiment, the math queue manager 110 comprises a scheduler 140 and a queue polling process 145. The scheduler 140 receives information from the clustered math engine 105 about available times for scheduling computations, schedules computations, and keeps track of the schedules and status of the computations from the time of scheduling until the completion of the computation. Preferably, the web server 120 receives user input regarding scheduling of computations and forwards such user input to the scheduler 140.

In some cases, the scheduler 140 can schedule a computation as soon as the user has selected a program and entered inputs. For example, the scheduler 140 can schedule a computation immediately when the user enters a complete set of inputs. However, under some circumstances, such as when the set of inputs is not yet complete, the scheduler 140 cannot schedule the computation and ensure that the computation can be performed at the scheduled time. The scheduler 140 cannot, for example, guarantee that all inputs will be entered at the time a computation is scheduled to be performed. In one embodiment, the scheduler 140 can nevertheless schedule the performance of the computation and essentially assume that the set of inputs will be completed in time. In this embodiment, if the set of inputs is not completed in time, the performance of the computation may fail. In such cases, the scheduler 140 may schedule a new time.

In one embodiment, the queue polling process 145 assists the math queue manager 110 to determine when a computation is ready for scheduling. In one embodiment, the queue polling process 145 periodically polls the program host 115 to determine whether a user has selected a program for scheduling and whether the inputs to the program are complete. When the queue polling process 145 determines that a program with complete inputs does exist, the scheduler 140 can schedule the computation. Preferably, the queue polling process 145 also periodically polls the clustered math engine 105 to obtain status information regarding running computations. Alternatively, the program host 115 or the clustered math engine 105 may initiate communications with the math queue manager 110, such that polling is not required.

An advantage of embodiments where the program host 115 and math queue manager 110 are separate from the web server 120 is that the user need not wait online until the clustered math engine 105 is able to perform the requested computation. Rather, the user can select a program, enter inputs and scheduling information, and log off. The program host 115 takes care of hosting the program and the inputs and the math queue manager 110 manages the scheduling and performance of the computation.

In one embodiment, when the scheduler 140 determines that it is time to perform a computation, the scheduler 140 communicates with the clustered math engine 105 and causes the clustered math engine 105 to perform the computation. Several alternatives exist for transmitting the programs, inputs, and instruction to perform a calculation to the clustered math engine 105. For example, program host 115 may transmit the program and inputs to the math queue manager 110 and the math queue manager 110 may in turn transmit the program and inputs to the clustered math engine 105 along with an instruction to perform the operation. Alternatively, the math queue manager 110 may indicate to the program host 115 that it is time to perform a computation, and the program host 115 may transmit the program and inputs, along with an instruction to perform the computation, to the clustered math engine 105. Alternatively, the program host 115 may transmit the program and inputs to the clustered math engine 105 while the math queue manager 110 transmits an instruction to perform the computation to the clustered math engine 105. Alternatively, the math queue manager 110 may indicate to the clustered math engine 105 that it is time to perform a computation and the clustered math engine 105 may request the program and inputs from the program host 115. In any of the above embodiments, the receipt by the clustered math engine 105 of the program and inputs may be deemed to be an instruction to perform the computation, such that an explicit instruction to perform the computation is not necessary in some embodiments.

Various types of scheduling are supported by the scheduler 140. For example, the scheduler 140 may attempt to schedule the performance of a computation at a specific time and date. A skilled artisan will appreciate, in light of this disclosure, that it may be difficult, in many cases, to calculate an exact time that the clustered math engine 105 will finish previously scheduled computations and be available to perform a future computation. In some embodiments, however, a computation may be scheduled for a particular starting time and may, if the computation has high priority, cause the clustered math engine 105 to interrupt the performance of previously-scheduled computations in order to start the newly-scheduled computation at the scheduled time.

Another type of scheduling supported by the scheduler 140 is simply to order the computations such that the computations will be performed on a first-in first-out basis. In this type of scheduling, the scheduler 140 need not specify a specific time at which a computation will begin. Rather, each computation will begin when its place in the queue is reached and the clustered math engine 105 has sufficient resources available to start the computation. Preferably, while a precise time that the computation will be performed may not be calculable, the math queue manager 110 provides a status of pending computations, including an estimate of when the computation will start.

The scheduler 140 may also support priority-based scheduling. For example, in one embodiment, a priority value may be assigned to each computation, and the system may, upon each opportunity to start a new computation, perform the pending computation that has the highest priority. If multiple computations have the same priority, the system may revert to first-in, first-out to break ties. Alternatively or additionally, a high priority computation may be allowed to move forward in a queue according to rules that prevent excessive delay of other computations. For example, high priority computations may not be allowed to move ahead of computations that have already been in the queue for an extended period of time, such as, for example, 6 hours.

In one embodiment, the scheduler 140 selects one or more computers within the clustered math engine 105 to execute a program. The selection of computers may be based on criteria. For example, in one embodiment, the scheduler 140 may select computers that have the lightest workload. Alternatively or additionally, the scheduler 140 may select computers that are specially adapted to perform a particular computation. Similarly, the scheduler 140 may also determine, in certain circumstances, to cause the execution of a variant of the user-selected program. For example, specialized variants may exist that can be performed more quickly and efficiently in some circumstances. Thus, the ability of the scheduler 140 to choose a variant program can advantageously increase the efficiency and power of the system.

In one embodiment, upon completion of a computation, outputs of a computation may be stored in the program host 115. The clustered math engine 105 may transmit the outputs to the program host 115 directly. Alternatively, the clustered math engine 105 may transmit the outputs to the math queue manager 110 and the math queue manager 110 may, in turn, transmit the outputs to the program host 115. The transmission of outputs may be initiated by the clustered math engine 105. Alternatively, the queue polling process 145 may periodically poll the clustered math engine 105 to determine the status of computations and may request that the outputs be transmitted upon determining that a computation has completed. Alternatively, the program host 115 may optionally have a polling process that polls the clustered math engine 105.

Preferably, the user is notified when a computation has completed and results are available for viewing. In one embodiment, the system sends a notification email to the user. Alternatively, a polling process 150 may periodically poll the program host 115 to determine if outputs have been stored in the program host 115. The polling process 150 may communicate with the web server 120 to indicate when results are available.

Preferably, the user can log into the web server 120 to view results of the computation. In one embodiment, the web server 120 displays textual information regarding the results of the computation. Alternatively or additionally, the web server displays graphical information regarding the results of the computation. In one embodiment, for example, the web server 120 is in communication with a graphical computation engine that is configured to display computational results in a graphical format. In one embodiment, the graphical computation engine is webMathematica, a commercially-available tool for running Mathematica computations and displaying results in graphical format on a web browser. While webMathematica is capable of performing independent computations, in the preferred embodiments, the graphical computation engine is used to graphically display the results of computations performed by the clustered math engine 105, not to independently perform computations. Alternatively, however, the graphical computation engine can perform post-processing computations on the outputs 135. For example, in one embodiment, the graphical computation engine performs computations that do not require the power of the clustered math engine 105, such as a computation of the mean of an array of results returned by the clustered math engine 105. An example of post-processing is to customize results for particular users. For example, a project manager may receive a report that includes the "big picture" but does not provide the most detailed results. A laboratory scientist, on the other hand, may receive a much more detailed report.

FIG. 1 depicts an embodiment by way of example and not limitation. A skilled artisan will appreciate, in light of this disclosure, that the systems and methods described herein can be implemented in a variety of ways consistent with the examples set forth herein. For example, while FIG. 1 shows the math queue manager 110, the program host 115, and the web server 120 in single blocks on a block diagram, this does not indicate or imply that each of these components must be on a single computer. In one embodiment, each of the math queue manager 110, the program host 115, and the web server 120 are executed on an individual computer, but this is not necessary. Any of these components, some of them, or all of them can be distributed across multiple computers. For example, in one embodiment, the web server 120 comprises multiple computers and requests to the web server 120 are distributed among the multiple computers in order to balance the load among the multiple computers.

Figure 2:
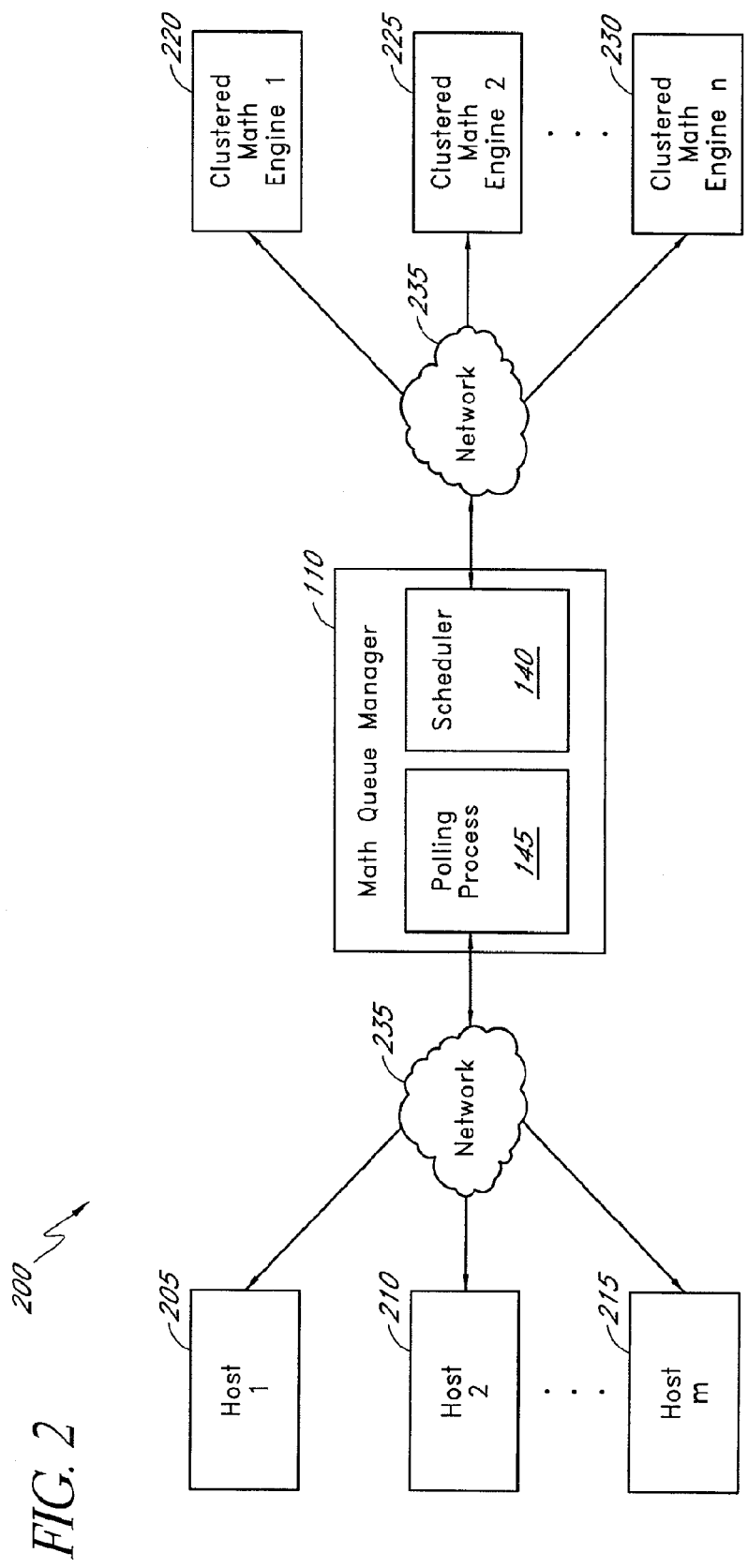
FIG. 2 is a block diagram that illustrates one embodiment of a networked system for performing clustered computations.

In one embodiment, the system is able to communicate with multiple program hosts and computation/math engines. FIG. 2 is a block diagram that illustrates one embodiment of a networked system for performing clustered computations. In one embodiment, a system for performing clustered computations 200 comprises a plurality of program host computers 205, 210, and 215, a math queue manager 110, and a plurality of clustered math engine computers 220, 225, and 230. These components are connected via a network 235. In one embodiment, the network 235 comprises the Internet.

In one embodiment of the networked system for performing clustered computations 200, inputs and programs can originate from any of the hosts 205, 210, or 215. The math queue manager 110 can schedule computations to be performed using the inputs and programs on any of the hosts 205, 210, or 215. Further the math queue manager 110 can schedule computations on any one or more of the clustered math engines 220, 225, or 230.

There are a variety of ways to determine which of the clustered math engines 220, 225, or 230 is to perform a given calculation. For example, in one embodiment, the math queue manager 110 determines which of the clustered math engines 220, 225, or 230 is best able to handle the computation. This determination may depend on a variety of factors, including, for example, the capacity of each engine, any unique capabilities that each engine may have, the speed of each engine, the schedule of each engine (that is, how busy each engine is and when each engine will be available), user preferences regarding which engine to use, and the like. Alternatively or additionally, particular engines may be reserved for specific purposes, such as, for example, to handle high priority computations, to handle computations requested by high priority clients, or the like. For example, in one embodiment, a client that performs many computations and needs rapid turnaround of computations may request that a specific portion of processing time for a particular clustered math engine 220 be reserved for computations from that client. The client may pay a fee for this reservation of processing time. The math queue manager 110 may be configured to assign computations requested by non-favored clients to other math engines in order to ensure that the clustered math engine 220 will generally be available to perform computations for the favored client.

In one embodiment, the different clustered math engines 220, 225, and 230 may differ in their capabilities, such as processing power, speed, computations supported, and the like. Advantageously, in this embodiment, the system is able to provide different levels of service depending on the needs of clients. For example, for computations that require high processing power and fast performance, the system may allow users to request that the fastest and most powerful engine is used. Alternatively, clients may desire to use a less powerful and slower engine for computations that are not time sensitive. An operator of the system may charge different fees based on the level of service chosen by a client.

In one embodiment, multiple clustered math engines 220, 225, and 230 may work together in order to solve particularly complex or time-sensitive computations. For example, the math queue manager 110 may assign portions of a computation to the clustered math engine 1 220 and other portions of the computation to the clustered math engine 2 225. Alternatively or additionally, the clustered math engines 220, 225, and 230 may participate in determining whether additionally engines are called in to perform a computation. For example, a computation may be assigned to the clustered math engine 1 220, and the clustered math engine 1 220 may determine that the cluster does not have sufficient resources to finish the computation quickly enough. In such a case, the clustered math engine 1 220 may directly communicate with the clustered math engine 2 225, for example, to assign a portion of the computation. Alternatively or additionally, the clustered math engine 1 220 may communicate with the math queue manager 110 to request that the math queue manager 110 assign a portion of the computation to one or more additional engines.

FIGS. 3-6 are simplified screen shots that illustrate a process of requesting a computation to be performed and receiving computation results. FIG. 3 is a simplified screen shot that illustrates the selection of a computation to be performed. A create new job screen 300 comprises a listing of computations 305 that are available to the user. The illustrated listing of computations 305 includes a "Weather Forecast" computation that determines likely future weather conditions based on current environmental conditions and a "Rocket Thrust" computation that determines the thrust that will be achieved by a rocket of specified parameters.

Preferably, the screen 300 is generated by the web server 120 and can be displayed using a standard web browser. Preferably, the computations listed in the list of computations 305 include the computations defined by the programs 125 stored on the program host 115. The list may not show every stored computation, however, because the list is preferably restricted to those computations that the user is authorized to access. Embodiments of the system determine whether a user is authorized to access a particular computation based at least in part on user-level and/or company-level permissions. Such permissions may be based, in whole or in part, on whether a user or company has paid a fee to obtain access to a particular computation. Preferably, the screen 300 provides an easy way for the user to choose one of the computations, such as the illustrated mechanism of providing a hypertext link for each of the computation names.

Figure 4:
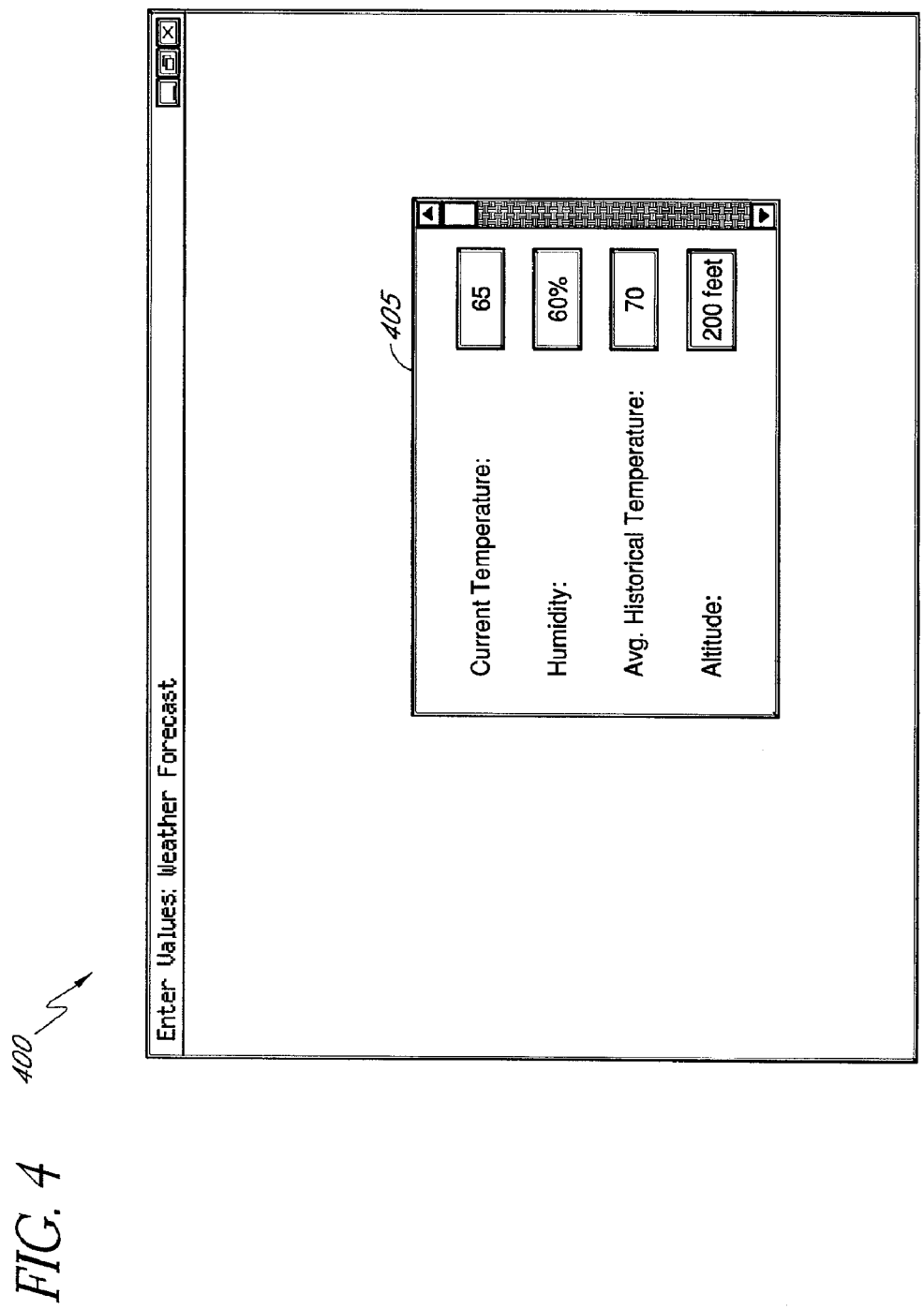
FIG. 4 is a simplified screen shot that illustrates a value entry screen.

FIG. 4 is a simplified screen shot that illustrates a value entry screen. The illustration of FIG. 4 shows, in particular, a value entry screen that may appear if a user chooses the "Weather Forecast" computation of FIG. 3. As shown, the value entry screen 400 comprises a plurality of input fields 405 for entering input values. The input fields 405 include, in this example, current temperature, humidity, average historical temperature, and altitude. A slider bar indicates the existence of additional input fields that are not shown on the present screen 400. As described above, the input fields 405 may be generated by the web server 120 and presented to the user in a standard web browser. User entry of the input fields 405 is one way that the system receives input values. As stated above, the system may also receive input from a text file, a spreadsheet file, or any other way known to a skilled artisan for receiving input values.

In one embodiment, the user is not required to enter all of the input values in one sitting. Preferably, the system allows the user to save a partial set of input values. The user can access the partial set at a later time, add to them, or change them. Upon final submission of a complete set of input values, the system can schedule the computation for performance by the clustered math engine 105.

FIG. 5 is a simplified screen shot that illustrates a view status screen. In one embodiment, the view status screen 500 displays the status of each computation accessible to the user. The status information 505 may comprise, for example, a status indicator, a time submitted, a time began, and a time completed. A skilled artisan will appreciate, in light of this disclosure, that the foregoing status information 505 is not a complete list, and other information may be included in a status information 505 page. The status indicator field may indicate whether a computation has been completed, queued, running, skipped, or that an error occurred. A skilled artisan will appreciate, in light of this disclosure, that other statuses are also possible.

As shown, the status information 505 shows that the "Weather Forecast" computation has completed and that the "Rocket Thrust" computation has been queued. Advantageously, in the illustrated embodiment, detailed results or status information can be obtained by selecting a hypertext link associated with each of the computations shown on the status page.

Figure 6:
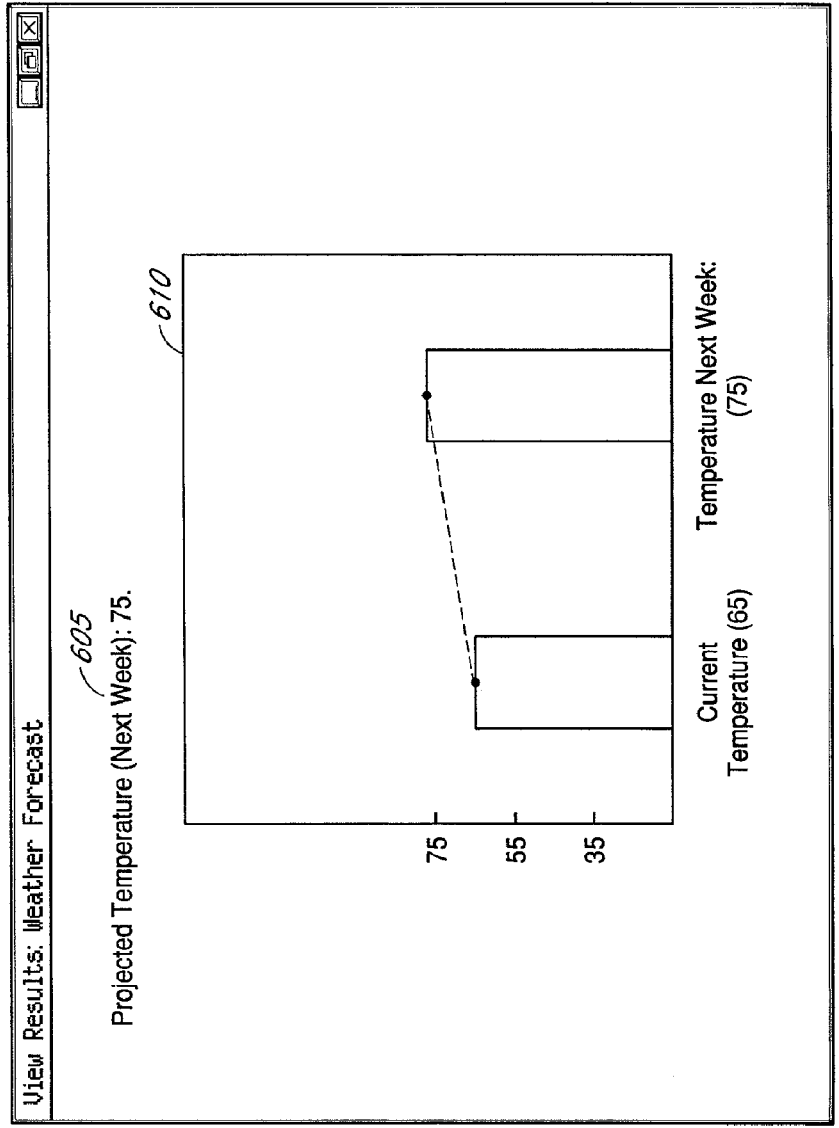
FIG. 6 is a simplified screen shot that illustrates a view results screen.

FIG. 6 is a simplified screen shot that illustrates a view results screen. In one embodiment, the view results screen 600 comprises textual results information 605 and graphical results information 610. The illustrated screen 600 shows the results of the Weather Forecast computation. According to the Weather Forecast computation, in one week the temperature is projected to increase from 65 to 75. Advantageously, the display of both textual results information 605 and graphical results information 610 allows a user to better understand the results and to analyze the results in any amount of detail that is desired. In one embodiment, the graphical results information 610 is generated by a graphical computation engine that is in communication with the web server 120. In one embodiment, the graphical computation engine is webMathematica.

Figure 7:
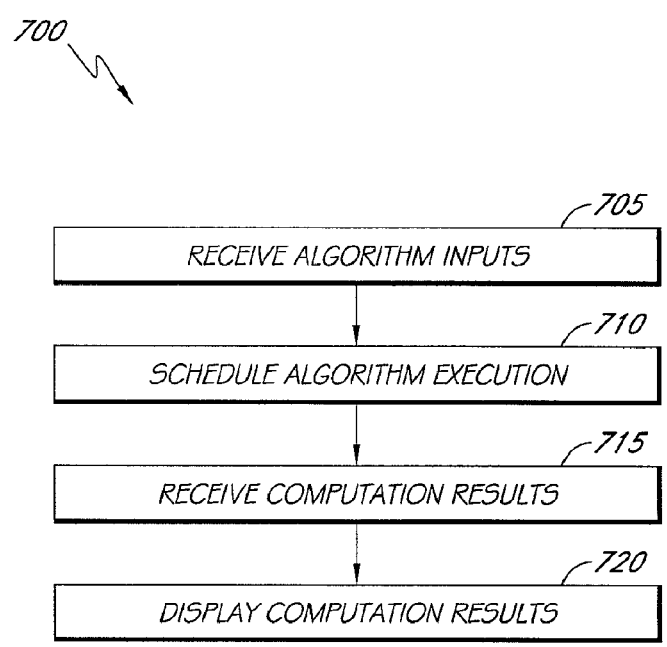
FIG. 7 is a flowchart that illustrates a process of performing a computation in accordance with one embodiment.

FIG. 7 is a flowchart that illustrates a process of performing a computation in accordance with one embodiment. A process of performing a computation 700 comprises a block 705 of receiving program inputs, a block 710 of scheduling program execution, a block 715 of receiving computation results, and a block 720 of displaying computation results. In the block 705, the process 700 receives program inputs. Preferably, the process 700 receives at least a portion of program inputs from a human user. Alternatively or additionally, the process 700 may receive program inputs from an automated process. For example, in one embodiment, the process 700 may receive program inputs by downloading information from a resource available on a computer network, such as, for example, information available on the World Wide Web. Preferably, the process 700 stores the program inputs in inputs 130 of the program host 115.

In the block 710, the process 700 schedules program execution. Preferably, program execution is scheduled when sufficient inputs have been received to perform a computation. In one embodiment, the queue polling process 145 of the math queue manager 110 detects when sufficient inputs exist in the inputs 130 of the program host 115 in order to schedule program execution. In one embodiment, the scheduler 140 performs the step of scheduling program execution. The scheduler 140 may perform this step at least in part by communicating with the clustered math engine 105 to determine when the clustered math engine 105 is available to execute the program.

In the block 715, the process 700 receives computation results. In one embodiment, the computation results are received by the program host 115 after execution of the program by the clustered math engine 105. In one embodiment, the queue polling process 145 of the math queue manager 110 detects when the clustered math engine 105 has executed the program and coordinates transmission of the results from the clustered math engine 105 to the program host 115. The transmission of the results from the clustered math engine 105 to the program host 115 may be direct. Alternatively or additionally, the transmission may be indirect. For example, an indirect transmission may go from the clustered math engine 105 to the math queue manager 110, to the program host 115. In one embodiment, the clustered math engine 105 may automatically transmit results upon execution of a program, without being directed by the math queue manager 110.

In one embodiment, the results are stored in a computer-accessible medium such as, for example, a hard disk drive, an optical disc, a CD-ROM, a DVD-ROM, a flash memory device, Random Access Memory, a magnetic tape, or any other storage medium known to a skilled artisan. In the block 720, the process 700 displays computation results. In one embodiment, the web server 120 performs the step of displaying computation results, received from one or more remote computers, to the user. Preferably, the web server 120 is in communication with a graphical computation engine such as webMathematica. The graphical computation engine such as webMathematics performs post-processing on the results in order to display the results in an understandable format. In one embodiment, the results are displayed in at least graphical format. Alternatively or additionally, the results may also be displayed in numerical or tabular format. Preferably, the user may choose different formats in which to view the results.

The process 700 is used to schedule program execution on the clustered math engine 105 and to receive results from the clustered math engine 105. Advantageously, providing a process for scheduling program execution and receiving results on a clustered math engine 105 allows users to have access to powerful computational features of the clustered math engine 105. Advantageously, in one embodiment, the process 700 is made accessible to the user over the web server 120, so that the user can control the operation of the process 700 using a standard web browser. Advantageously, an embodiment also provides for asynchronous scheduling of program execution on the clustered math engine 105.

Figure 8:
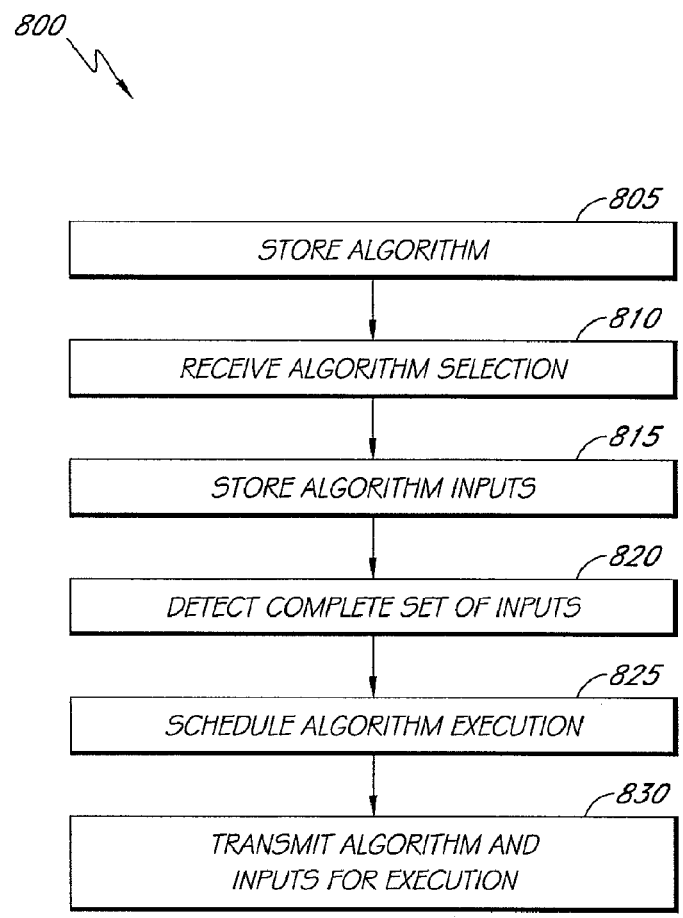
FIG. 8 is a flowchart that illustrates another embodiment of a process of performing a computation.

FIG. 8 is a flowchart that illustrates another embodiment of a process of performing a computation. A process of performing a computation 800 comprises a block 805 of storing a program, a block 810 of receiving a program selection, a block 815 of storing program inputs, a block 820 of detecting a complete set of inputs, a block 825 of scheduling program execution, and a block 830 of transmitting a program and inputs for execution. In the block 805, the process 800 stores a program on a computer-accessible storage medium. Preferably, the process 800 stores the program as part of programs 125 of the program host 115. Advantageously, providing the program host 115 on a server separate from a user computer but accessible to the user computer over network allows the user to have access to powerful programs without having to program the programs or to store the programs on local storage. The hosted programs 125 may be very complex and may be outside the skill of a user to compute. Advantageously, however, by providing access to the hosted programs 125, the process 800 may allow the user to access a program and have the program performed without having detailed knowledge of how the program works. Rather, preferably the user needs only select the program and, in some cases, provide inputs to the program.

In the block 810, the process 800 receives a program selection. Preferably, in this step, the process 800 receives a selection from a user regarding a specific program that the user wants the clustered math engine 105 to execute. For example, as illustrated on the screen 300 of FIG. 3, a user may select the "Optimal Product Price" program or the "Stock Target Price" program. In one embodiment, the web server 120 performs the step of receiving a program selection.

In the block 815, the process 800 stores program inputs on a computer-accessible storage medium. Preferably, the process 800 receives at least a portion of the program inputs to be stored from a human user. Alternatively or additionally, the process 800 may receive program inputs from an automated process. For example, in one embodiment, the process 800 may receive program inputs by downloading information from a resource available on a computer network, such as, for example, information available on the World Wide Web. Preferably, the process 800 stores the program inputs in inputs 130 of the program host 115.

In the block 820, the process 800 detects a complete set of inputs. Preferably, the detection of a complete set of inputs includes determining that enough inputs are stored to allow the clustered math engine 105 to perform the program. In one embodiment, the math queue manager 110 performs the step of detecting a complete set of inputs. Preferably, the queue polling process 145 of the math queue manager 110 performs this step. Alternatively or additionally, the program host 115 may determine whether a complete set of inputs has been stored. Advantageously, the step of detecting a complete set of inputs allows a user to enter inputs at different times so that a user does not have to enter all inputs at once. A user can, for example, select a program and enter some inputs in one sitting, come back a second time to enter other inputs, and come back a third time to direct the program host 115 to retrieve other inputs from a resource accessible to the program host 115. The step of detecting a complete set of inputs is also advantageous because it is compatible with the possibility that inputs may need to be gathered over time. For example, a user may select a program that determines the mean daily temperature over the next month. Such a program cannot be executed immediately because future daily temperature readings must occur before sufficient inputs exist to execute the program.

In the block 825, the process 800 schedules program execution. Preferably, program execution is scheduled when sufficient inputs have been received to perform a computation. In one embodiment, the queue polling process 145 of the math queue manager 110 detects when sufficient inputs exist in the inputs 130 of the program host 115 in order to schedule program execution. In one embodiment, the scheduler 140 performs the step of scheduling program execution. The scheduler 140 may perform this step at least in part by communicating with the clustered math engine 105 to determine when the clustered math engine 105 is available to execute the program.

In the block 830, the process 800 transmits the program and inputs for execution. In one embodiment, the program host 115 transmits the program and the inputs to the clustered math engine 105. The clustered math engine 105 then executes the program using the transmitted inputs. Advantageously, this model of hosting inputs and programs separately from the clustered math engine 105 allows the clustered math engine 105 to focus on the performance of powerful mathematical computations rather than devote resources to storing inputs and programs.

Preferably, the process 800 is used to schedule program execution on the clustered math engine 105 and to receive results from the clustered math engine 105. Advantageously, providing a process for scheduling program execution and receiving results on a clustered math engine 105 allows users to have access to powerful computational features of the clustered math engine 105. Advantageously, in one embodiment, the process 800 is made accessible to the user over the web server 120, so that the user can control the operation of the process 800 using a standard web browser. Advantageously, an embodiment also provides for asynchronous scheduling of program execution on the clustered math engine 105.

Figure 9:
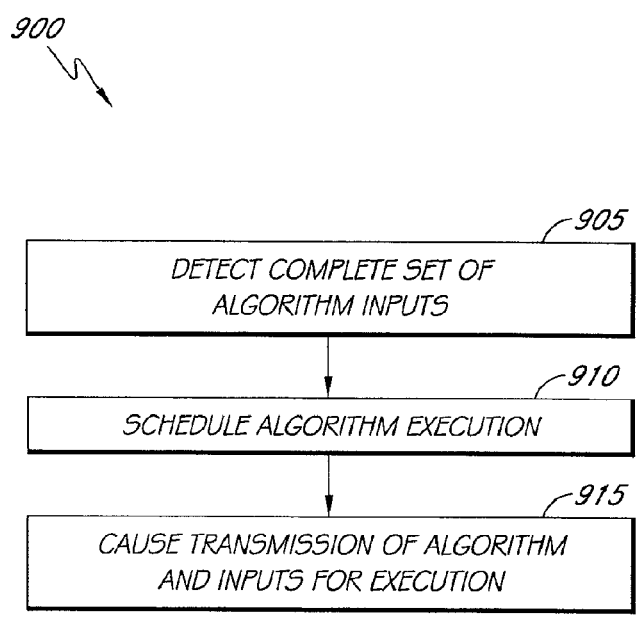
FIG. 9 is a flowchart that illustrates a process of scheduling computations in accordance with one embodiment.

FIG. 9 is a flowchart that illustrates a process of scheduling computations in accordance with one embodiment. In one embodiment, a process of scheduling computations 900 comprises a block 905 of detecting a complete set of program inputs, a block 910 of scheduling program execution, and a block 915 of causing the transmission of a program and inputs for execution. In one embodiment, the process 900 is performed by the math queue manager 110.

In the block 905, the process 900 detects a complete set of program inputs. Preferably, the detection of a complete set of inputs includes determining that enough inputs are stored to allow the clustered math engine 105 to perform the program. In one embodiment, the math queue manager 110 performs the step of detecting a complete set of inputs. Preferably, the queue polling process 145 of the math queue manager 110 performs this step. Alternatively or additionally, the program host 115 may determine whether a complete set of inputs has been stored. Advantageously, the step of detecting a complete set of inputs allows a user to enter inputs at different times so that a user does not have to enter all inputs at once. A user can, for example, select a program and enter some inputs in one sitting, come back a second time to enter other inputs, and come back a third time to direct the program host 115 to retrieve other inputs from a resource accessible to the program host 115. The step of detecting a complete set of inputs is also advantageous because it is compatible with the possibility that inputs may need to be gathered over time. For example, a user may select a program that determines the mean daily temperature over the next month. Such a program cannot be executed immediately because future daily temperature readings must occur before sufficient inputs exist to execute the program.

In the block 910, the process 900 schedules program execution. Preferably, program execution is scheduled when sufficient inputs have been received to perform a computation. In one embodiment, the queue polling process 145 of the math queue manager 110 detects when sufficient inputs exist in the inputs 130 of the program host 115 in order to schedule program execution. In one embodiment, the scheduler 140 performs the step of scheduling program execution. The scheduler 140 may perform this step at least in part by communicating with the clustered math engine 105 to determine when the clustered math engine 105 is available to execute the program.

In the block 915, the process 900 causes the transmission of the program and inputs for execution. In one embodiment, the math queue manager 110 causes the program host 115 to transmit the program and the inputs to the clustered math engine 105. The clustered math engine 105 then executes the program using the transmitted inputs. Advantageously, this model of hosting inputs and programs separately from the clustered math engine 105 allows the clustered math engine 105 to focus on the performance of powerful mathematical computations rather than devote resources to storing inputs and programs.

The process 900 is used to schedule program execution on the clustered math engine 105 and to receive results from the clustered math engine 105. Providing a process for scheduling program execution and receiving results on a clustered math engine 105 allows users to have access to powerful computational features of the clustered math engine 105. In one embodiment, the process 900 is made accessible to the user over the web server 120, so that the user can control the operation of the process 900 using a standard web browser. An embodiment also provides for asynchronous scheduling of program execution on the clustered math engine 105.

Figure 10:
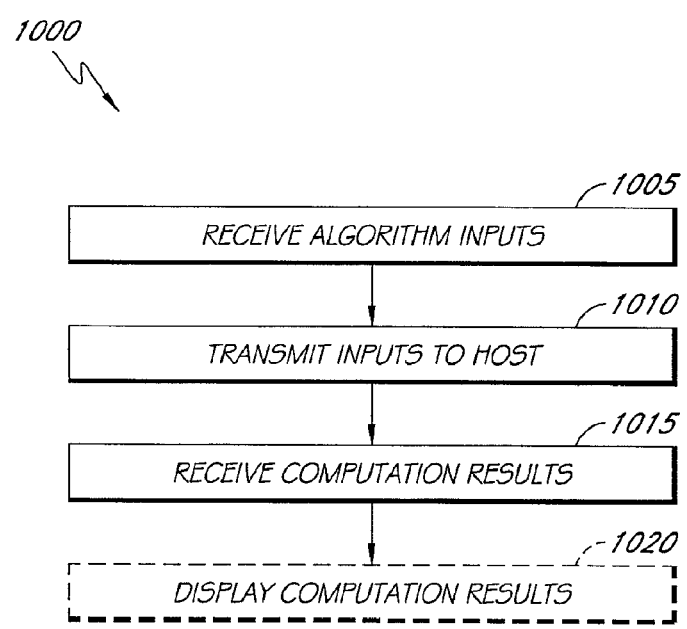
FIG. 10 is a flowchart that illustrates a process of receiving program inputs and receiving computation results.

FIG. 10 is a flowchart that illustrates a process of receiving program inputs and receiving computation results. A process of receiving program inputs and receiving computation results 1000 comprises a block 1005 of receiving program inputs, a block 1010 of transmitting inputs to a host, a block 1015 of receiving computation results, and a block 1020 of displaying computation results. In one embodiment, the process 900 is performed by the web server 120. In the block 1005, the process 1000 receives program inputs. In one embodiment, the web server 120 receives the program inputs by serving a web page or other input form that prompts the user for inputs. Alternatively or additionally, the web server 120 may receive program inputs from an automated process.

In the block 1010, the process 1000 transmits program inputs to a program host. In one embodiment, the web server 120 transmits the inputs to the program host 115. Preferably, the program host 115 stores the inputs in the inputs 130. Preferably, the program host 115 is separate from the web server 120 and from the user's computer. Preferably, the program host 115 is accessible to the clustered math engine 105 even when the user's computer or the web server 120 is not accessible, such that once inputs are received, the clustered math engine 105 may access the inputs without regard to whether the user's computer is on and connected to the network. The program host 115 is on one or more computers that are separate from the clustered math engine 105. Optionally, however, the program host 115 may be stored on one more or computers that are part of the clustered math engine 105.

In the block 1015, the process 1000 receives computation results. In one embodiment, the web server 120 performs the step of receiving computation results. Preferably, the web server 120 receives the computation results when it is determined that the results exist in the outputs 135 of the program host 115. The web server 120 may use a polling process, such as the polling process 150, to determine when the results exist in the outputs 135 of the program host 115.

In the block 1020, the process 1000 displays computation results. In one embodiment, the web server 120 performs the step of displaying computation results by serving a web page or other display page to the user's web browser. In one embodiment, the web server 120 is in communication with a graphical computation engine, such as, for example, web-Mathematica. The graphical computation engine may perform post-processing operations on the results in order to display the results in graphical form. Alternatively or additionally, the graphical computation engine may perform computations of lower complexity that don't need the power of the clustered math engine 105.

Advantageously, the process 1000 may be performed on a web server such that it is accessible to a user of a standard web browser. The process 1000 thus provides a user of a standard web browser with access to powerful mathematical computations that may be performed on the clustered math engine 105. The simplicity of the process 1000 demonstrates the power of providing such access to a user of a standard web browser. The user need not know anything about the clustered math engine 105. The user does not need to own the clustered math engine 105 or even understand how it works. Rather, the user simply enters program inputs (received by the process 1000 in the block 1005), allows the clustered math engine 105 to execute the program in the background (without the user knowing anything about the operation of the clustered math engine 105), and receive computation results that may be displayed to the user in graphical, textual, or tabular format.

In accordance with the foregoing embodiment, systems and methods described herein provide a user with access to a powerful computational engine, without requiring the user to own the computational engine or understand how it works. The user selects a program and enters program inputs using simple input forms provided using a standard web interface. Embodiments of the systems and methods described herein take care of scheduling a powerful clustered math engine to perform the computations. When it is time for the clustered math engine 105 to perform the computations, the systems and methods described herein take care of transmitting the programs and the inputs to the clustered math engine 105. Finally, the systems and methods disclosed herein transmit results to the user when the computations have been performed.

As set forth herein, the math queue manager 110 maintains a queue that determines the order in which computations are performed. In one embodiment, users with queue management authorization may manually manage the queue. For example, a user may reorder computations, cause computations to be delayed or skipped, delete computations such that they are not performed, change computation priorities, and the like.

Embodiments of the systems and methods described herein provide access control to computations and the results thereof. In one embodiment, a user can only access results for computations that he submitted. Alternatively or additionally, one or more users associated with the submitting user may also review results. For example, in one embodiment, the system allows a group of assigned users in a company to access results of computations submitted by another member of the group. Access control may also be used to determine which users are authorized to enter inputs, modify computations that have been scheduled, assign access permissions, or any other task. In one embodiment, the system allows users with access-granting privileges to set which users are authorized to access which computations. In one embodiment, a user may set such permissions by checking a box for each user authorized to access a particular computation. A skilled artisan will appreciate, in light of this disclosure, that any type of access control may be used, and that any level of complexity of access control may be used.

In one embodiment, users are able to create new programs for storage at the program host 115. Embodiments of the systems and methods provide a computer system that allows users to create new programs and to upload the newly created programs to the program host 115. In one embodiment, the user can specify who may have access to the programs created and uploaded by that user. In addition, operators of the program host 115 may, from time to time, create and add programs for general access by clients. In addition to program creation, one embodiment allows for editing or deletion of existing modules. In one embodiment, the system allows users to upload programs to the program host 115 that the user has developed on other computers. The user can then use the system to schedule the execution of the uploaded programs on the clustered math engine 105. Advantageously, this gives users an option to develop and use programs without spending the time or resources of the development computer system.

In embodiments of the systems and methods disclosed herein, notifications may be sent to users or to automated processes upon the occurrence of specific events. For example, in one embodiment, an email notification may be sent when a computation has been started by the clustered math engine 105. Other notifications may include completion of a computation, scheduling of a computation, completion of entry of inputs, rescheduling of a computation (such as if a computation is skipped to get to a computation with higher priority), the occurrence of an error, or notification of any other event. Notifications may be made using any known method of notification, including, without limitation, email, telephone, pager, voicemail, instant message, or text message. Notifications to automated processes may be made in a format that can be read by the automated process so as to cause the automated process to respond to the notification. For example, an automated process may automatically request that results be downloaded to a specific computer upon receiving a notification that a computation has completed.

In one implementation of grid computing, several nodes are internetworked. One node is the head node. The head node manages the grid. Other nodes are known as slaves. In one embodiment, the math queue manager 110 is located on the head node of a grid. Alternatively, the math queue manager 110 is located outside of a grid. In one embodiment, the system provides a mechanism for administering the grid, including designating the head node and slave nodes that belong to a particular grid.

Head nodes and slave nodes are not used in all forms of grid-based and cluster-based computing, and they are not a necessary feature of the invention. Rather, embodiments of the systems and methods disclosed herein can be adapted to work in other distributed computing environments. For example, the systems and methods described herein can be adapted to work on a peer-to-peer network that has no head node or centralized administrator of the network.

As indicated above, one embodiment of the clustered math engine 105 is implemented using gridMathematica. In one embodiment using gridMathematica, communication with the clustered math engine 105 is performed using J/Link.

J/Link is a communications interface built on MathLink, an API for communicating with gridMathematica from other programs. Presently, job execution using J/Link is synchronous. Accordingly, in one embodiment, the math queue manager 110 maintains a connection with the clustered math engine 105 for the duration of a computation. This may be accomplished by executing each clustered math engine 105 job in a separate thread. This advantageously allows the math queue manager 110 to manage multiple computations simultaneously. Further, it allows for asynchronous scheduling of computations on the clustered math engine 105. This is particularly advantage compared to gridMathematica, which presently requires synchronous job execution.

The foregoing systems and methods have been described as being implemented as computer software that is executed on one or more general-purpose computers. A skilled artisan will appreciate, in light of this disclosure, that a general-purpose computer executing software functions as a special-purpose computer configured to perform specifically defined functions. The systems and methods herein can alternatively be implemented on special-purpose computers whose hardware is configured to perform the functions set forth herein. Accordingly, while it is advantageous to implement the systems and methods using computer software, the systems and methods herein can be implemented using hardware, software, or firmware, or any combination of hardware, software, and firmware.

As will be appreciated by a skilled artisan in light of this disclosure, software implementations of the systems and methods described herein comprise, in one embodiment, a plurality of software modules, procedures, functions, methods, routines, subroutines, and the like. As used herein, the term "module" encompasses any group of computer-executable instructions that are configured, when executed, to cause a computer to perform functions defined by the instructions, regardless of how those instructions are organized. Thus, "module" encompasses a procedure, a function, a method, a routine, a subroutine, or any other organizational unit for computer-executable instructions. Further, a module may be implemented in more than one organizational unit, such that multiple organizational units cooperate to perform a function. Conversely, a single organizational unit may define multiple functions and may thus constitute more than one module. The computer-executable instructions can be stored on a computer-readable medium, such as, for example, a hard disk drive, an optical disc, a CD-ROM, a DVD-ROM, a flash memory, Random Access Memory, or the like. The computer-executable instructions can also be encoded as electrical signals and transmitted across communications lines such that they can be stored or executed at a remote computer. Any, some, or all of the functions set forth herein can be implemented using software modules.

The foregoing embodiments of the systems and methods have been disclosed by way of example and not limitation. The examples set forth herein are sufficient to teach a skilled artisan to practice, in addition to the embodiments explicitly disclosed, other alternative embodiments that are apparent in view of this disclosure. The invention is not limited to the specific example embodiments set forth herein, but encompasses any alternative embodiment that would be appreciated by a skilled artisan in view of this disclosure.

We claim:

1. A clustered computational system comprising:
   a clustered computational engine comprising a plurality of clustered computers, including at least one memory coupled to at least one special-purpose processor, that perform computations;
   a program host computer that stores, on a computer-accessible storage device, a plurality of programs and a plurality of inputs to the programs, the programs invoke computations that are executed by the clustered computational engine, and each computation defines a set of parameters prescribing input data that the computation must receive to generate output data of the computation and each computation receives input data for each of the parameters in the defined set of parameters and generates output data;
   a program hosting component that receives, from at least one remote computer, a selection of one of the stored programs for execution by the program host computer;
   an input component that receives, from at least one remote computer, input data to the stored program that is to be executed, the received input data are stored on the computer-accessible storage device of the program host computer;
   a web server that receives user selections of computations to be performed on the clustered computational engine, transmits the user selections to the program host computer, and receives results of computations performed by the clustered computational engine; and
   a queue manager comprising an automated process that periodically receives communications from the program host computer in order to determine when the program host computer has stored input data satisfying every one of the defined set of parameters for a computation invoked by the selected program, such that the computation is able to generate output data, and, upon determining that the program host computer has stored said input data, to automatically schedule execution of the computation by the clustered computational engine, such that said scheduling of the execution of the computation by the clustered computational engine is automatically delayed at least until the program host computer has stored input data satisfying every one of the defined set of parameters for a computation invoked by the selected program.

2. The system of claim 1, wherein the clustered computers of the clustered computational engine communicate with each other, at least in part, using Message Passing Interface.

3. The system of claim 1, wherein the web server also displays the results of computations.

4. The system of claim 1, wherein the web server is in communication with a graphics component that assists the web server to display the results in graphical format.

5. The system of claim 4, wherein the graphics component also performs computations and the system assigns the graphics component to perform computations that do not require the clustered computational engine.

6. The system of claim 1, wherein the input component receives inputs to the stored program at different times.

7. A clustered computational system comprising:
   a clustered computational engine comprising a plurality of clustered computers, including at least one memory coupled to at least one processor, that perform computations;
   a program host computer that stores, on a computer-accessible storage device, a plurality of programs and a plurality of inputs to the programs, the programs invoke computations that are executed by the clustered computational engine, and each computation defines a set of parameters prescribing input data that the computation must receive to generate output data of the computation and each computation receives input data for each of the parameters in the defined set of parameters and generates output data;
   a program hosting component that receives, from at least one remote computer, a selection of one of the stored programs for execution by the program host computer;
   an input component that receives, from at least one remote computer, input data to the stored program that is to be executed, the received input data are stored on the computer-accessible storage device of the program host computer;
   a web server that receives user selections of computations to be performed on the clustered computational engine, transmits the user selections to the program host computer, and receives results of computations performed by the clustered computational engine; and
   a queue manager comprising an automated process that periodically receives communications from the program host computer in order to determine when the program host computer has stored input data satisfying every one of the defined set of parameters for a computation invoked by the selected program, such that the computation is able to generate output data, and, upon determining that the program host computer has stored said input data, to automatically schedule execution of the computation by the clustered computational engine, such that said scheduling of the execution of the computation by the clustered computational engine is automatically delayed at least until the program host computer has stored input data satisfying every one of the defined set of parameters for a computation invoked by the selected program.

8. The system of claim 7, wherein the clustered computers of the clustered computational engine communicate with each other, at least in part, using Message Passing Interface.

9. The system of claim 7, wherein the web server also displays the results of computations.

10. The system of claim 9, wherein the web server is in communication with a graphics component that assists the web server to display the results in graphical format.

11. The system of claim 10, wherein the graphics component also performs computations and the system assigns the graphics component to perform computations that do not require the clustered computational engine.

12. The system of claim 7, wherein the input component receives inputs to the stored program at different times.

13. A clustered computational system comprising:
   a clustered computational engine comprising a plurality of clustered computers, including at least one memory coupled to at least one special-purpose processor, that perform computations and that communicate with each other, at least in part, using Message Passing Interface;
   a program host computer that stores, on a computer-accessible storage device, a plurality of programs and a plurality of inputs to the programs, the programs invoke computations that are executed by the clustered computational engine, and each computation defines a set of parameters prescribing input data that the computation must receive to generate output data of the computation and each computation receives input data for each of the parameters in the defined set of parameters and generates output data;

a program hosting component that receives, from at least one remote computer, a selection of one of the stored programs for execution by the program host computer;

an input component that receives, from at least one remote computer, input data to the stored program that is to be executed, the received input data are stored on the computer-accessible storage device of the program host computer;

a web server that receives user selections of computations to be performed on the clustered computational engine, transmits the user selections to the program host computer, and receives results of computations performed by the clustered computational engine; and a queue manager comprising an automated process that determines when the program host computer has stored input data satisfying every one of the defined set of parameters for a computation invoked by the selected program, such that the computation is able to generate output data, and, upon determining that the program host computer has stored said input data, to automatically schedule execution of the computation by the clustered computational engine, such that said scheduling of the execution of the computation by the clustered computational engine is automatically delayed at least until the program host computer has stored input data satisfying every one of the defined set of parameters for a computation invoked by the selected program.

14. The system of claim 13, wherein the web server comprises multiple computers and requests to the web server are distributed among the multiple computers in order to balance load among the multiple computers.

15. The system of claim 13, wherein the web server also displays the results of computations.

16. The system of claim 15, wherein the web server is in communication with a graphics component that assists the web server to display the results in graphical format.

17. The system of claim 16, wherein the graphics component also performs computations and the system assigns the graphics component to perform computations that do not require the clustered computational engine.

18. The system of claim 13, wherein the input component receives inputs to the stored program at different times.

* * * * *

UNITED STATES PATENT AND TRADEMARK OFFICE
CERTIFICATE OF CORRECTION

PATENT NO. : 8,849,889 B1
APPLICATION NO. : 13/846567
DATED : September 30, 2014
INVENTOR(S) : Ariela Tannenbaum Page 1 of 1

It is certified that error appears in the above-identified patent and that said Letters Patent is hereby corrected as shown below:

Title page, (item 71, Applicant) at line 1, Change "LLC," to --Inc.,--.

In the Claims

Column 19 at line 51, In Claim 4, change "claim 1," to --claim 3,--.

Signed and Sealed this
Eighteenth Day of August, 2015

Michelle K. Lee
*Director of the United States Patent and Trademark Office*